US009628952B2

(12) United States Patent
Schell

(10) Patent No.: US 9,628,952 B2
(45) Date of Patent: Apr. 18, 2017

(54) METHODS FOR DETERMINING RELATIVE LOCATIONS OF MULTIPLE NODES IN A WIRELESS NETWORK

(71) Applicant: Apple Inc., Cupertino, CA (US)

(72) Inventor: Stephan V. Schell, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 136 days.

(21) Appl. No.: 13/774,266

(22) Filed: Feb. 22, 2013

(65) Prior Publication Data

US 2014/0241175 A1 Aug. 28, 2014

(51) Int. Cl.
*H04W 4/02* (2009.01)
*H04W 4/06* (2009.01)

(52) U.S. Cl.
CPC ............ *H04W 4/023* (2013.01); *H04W 4/06* (2013.01)

(58) Field of Classification Search
None
See application file for complete search history.

(56) References Cited

U.S. PATENT DOCUMENTS

| 7,626,969 B2* | 12/2009 | Hart et al. | 370/338 |
|---|---|---|---|
| 8,325,653 B2* | 12/2012 | Whitehill et al. | 370/329 |
| 2005/0060069 A1* | 3/2005 | Breed et al. | 701/29 |
| 2008/0240116 A1* | 10/2008 | Niu et al. | 370/400 |
| 2011/0025494 A1* | 2/2011 | Adcook et al. | 340/539.13 |
| 2013/0010617 A1* | 1/2013 | Chen et al. | 370/252 |

OTHER PUBLICATIONS

Hedley et al., "Fast and Accurate Tracking in Wireless Networks" Wireless and Networking Technologies Labratory, CSIRO, 2011, 1172-1176, Sydney, Australia.
Marziani et al., "Simultaneous Round-Trip Time-of-Flight Measurements With Encoded Acoustic Signals" IEEE Sensors Journal, Oct. 2012, vol. 12, No. 10, 2931-2940.

* cited by examiner

*Primary Examiner* — Hassan Phillips
*Assistant Examiner* — Omeed D Rahgozar
(74) *Attorney, Agent, or Firm* — Treyz Law Group, P.C.; Jason Tsai; Zachary D. Hadd

(57) ABSTRACT

A wireless communications network may include multiple nodes, one of which is selected as a master node. The nodes may take turns broadcasting respective packets according to a predetermined broadcast schedule. During any given broadcast iteration, each node may broadcast a packet while the other remaining nodes receive the broadcast packet in parallel. In response to receiving the broadcast packet, each node may be configured to obtain desired estimated timing values. The estimated timing values may be transmitted back to the master node for use in computing time-of-flight information. Frequency-synchronization operations may be periodically performed to help reduce timing errors. The time-of-flight information, along with other location-based metrics, may be used in determining the relative positions of the multiple nodes in the network.

17 Claims, 10 Drawing Sheets

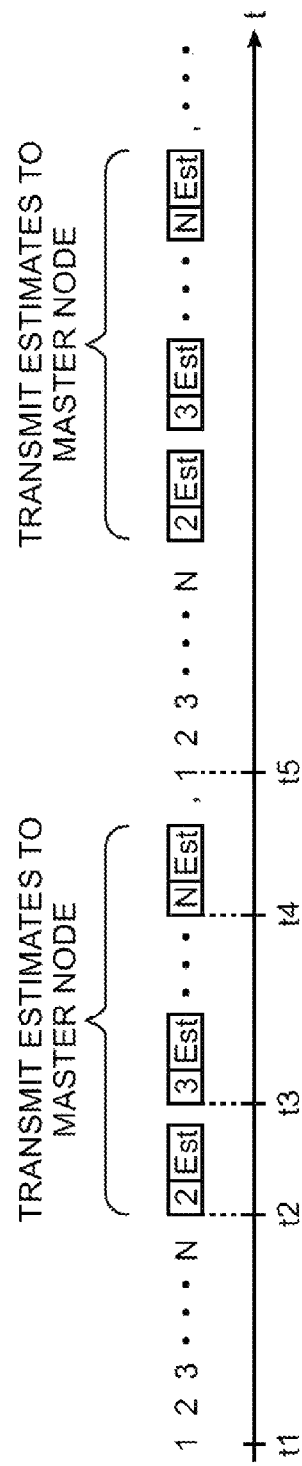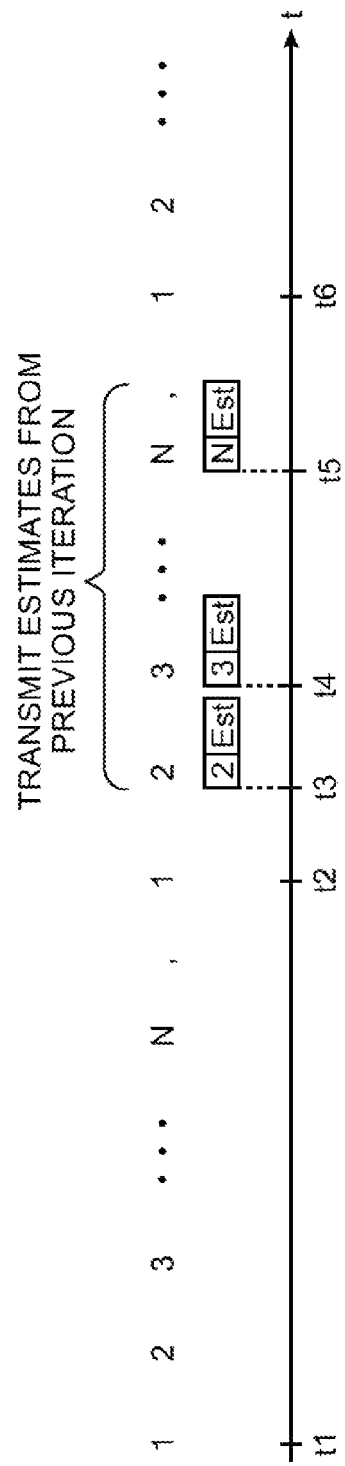

METHODS FOR DETERMINING RELATIVE LOCATIONS OF MULTIPLE NODES IN A WIRELESS NETWORK

BACKGROUND

This relates to wireless electronic devices and more particularly, to ways of operating wireless electronic devices in a radio-frequency communications network.

Electronic devices such as handheld electronic devices, portable electronic devices, and computers are often provided with wireless communications capabilities. Electronic devices with wireless communications capabilities include antennas that serve to transmit and receive radio-frequency signals.

In many applications, it may be desirable to determine the relative location of different components in a network. The different components are sometimes referred to as "nodes" in the network. Conventional relative positioning techniques typically involve estimating times-of-flight (TOFs) between pairs of nodes in the network. In wireless networks where locking nodes to a common time base is not practicable, estimation of TOF requires round-trip time (RTT) estimation between each pair of nodes in the network.

During typical RTT estimation procedures, a first node transmits a packet to a second node. After a deterministic internal turn-around delay, the second node transmits a return packet back to the first node. The first node then processes the return packet to estimate a corresponding round-trip time. The first node may then repeat this process with a third node in the network. This process may be iterated for each respective pair of nodes in the network. When performing this type of RTT estimation, only two nodes are active at any given point in time. As a result, performing relative positioning of multiples nodes in a wireless network can be undesirably time-consuming, particularly when the network includes a large number of nodes.

It may therefore be desirable to provide improved methods for determining the relative positions of different nodes in a wireless network.

SUMMARY

A method for operating a plurality of nodes in a wireless communications network is provided. Each node may be an electronic device that includes wireless communications circuitry. Each node in the network may broadcast a respective packet according to a schedule, where at most one node is allowed to broadcast at any given point in time. While a node is broadcasting, the other remaining nodes may receive the broadcast packet in parallel. In response to receiving the broadcast packet, the receiving nodes may be configured to obtain desired timing estimates.

A first portion of the plurality of nodes may obtain estimated timing parameters of a first type (sometimes referred to herein as primary estimates), whereas a second portion of the plurality of nodes may obtain timing estimated timing parameters of a second type (sometimes referred to herein as secondary estimates). The first and second portions may or may not include overlapping nodes. The primary timing estimate may reflect an amount of time between the given node broadcasting a packet and the given node receiving a broadcast packet from another node in the plurality of nodes. The secondary timing estimate may reflect an amount of time between a given node receiving a first broadcast packet from a first node in the plurality of nodes and receiving a second broadcast packet from a second node in the plurality of nodes.

One of the nodes may be selected as the master node. Nodes other than the master node (sometimes referred to as slave nodes) may transmit respective primary and/or secondary timing estimates back to the master node. In one suitable arrangement, the timing estimates may be separately transmitted to the master node after each of the plurality of nodes has finished broadcasting in a current broadcast iteration. In another suitable arrangement, the timing estimates obtained during a first broadcast iteration may be conveyed back to the master node during a second broadcast iteration that follows the first broadcast iteration.

The primary and secondary estimates may be combined using a least-squares method or a weighted average method (as examples). If desired, the timing estimates may be fed to computing equipment that is configured to compute time-of-flight information based on the timing estimates, angle of arrival information, time difference of arrival information, satellite navigation system information, and/or other positioning information. The time-of-flight information may be used in determining the relative positions of the nodes in the network.

If desired, frequency synchronization updates may be performed periodically by the master node broadcasting frequency synchronization signals that the other nodes then receive and process. The frequency synchronization signals may be distinct broadcasts or may be embedded in the broadcasts used for time-of-flight estimation. One or more frequency synchronization updates may be interspersed throughout each broadcast iteration to help reduce timing errors.

Further features of the present invention, its nature and various advantages will be more apparent from the accompanying drawings and the following detailed description.

BRIEF DESCRIPTION OF THE DRAWINGS

FIGS. 7A and 7B are diagrams showing how a frequency-synch broadcast can be sent to reduce inter-node timing errors in accordance with an embodiment of the present invention.

FIGS. 8A, 8B, and 8C are diagrams showing different possible sequences that can be used when performing periodic frequency-synch updates in accordance with an embodiment of the present invention.

FIG. 9 is a timing diagram showing how a series of broadcasts may be followed by a time period during which a master node receives timing estimators from other nodes in accordance with an embodiment of the present invention.

FIG. 10 is a timing diagram showing how timing estimators may be transmitted back to the master node during a subsequent broadcast iteration in accordance with an embodiment of the present invention.

DETAILED DESCRIPTION

Embodiments of the present invention relate to electronic devices. It will be recognized by one skilled in the art, that the present exemplary embodiments may be practiced without some or all of these specific details. In other instances, well-known operations have not been described in detail in order not to unnecessarily obscure the present embodiments.

Electronic devices may be provided with wireless communications circuitry. The wireless communications circuitry may be used to support wireless communications in multiple wireless communications bands. The wireless communications circuitry may include multiple antennas such as loop antennas, inverted-F antennas, strip antennas, planar inverted-F antennas, slot antennas, hybrid antennas that include antenna structures of more than one type, or other suitable antennas. Conductive structures for the antennas may be formed from conductive electronic device structures such as conductive housing structures (e.g., a ground plane and part of a peripheral conductive housing member or other housing structures), traces on substrates such as traces on plastic, glass, or ceramic substrates, traces on flexible printed circuit boards ("flex circuits"), traces on rigid printed circuit boards (e.g., fiberglass-filled epoxy boards), sections of patterned metal foil, wires, strips of conductor, other conductive structures, or conductive structures that are formed from a combination of these structures.

Figure 1:
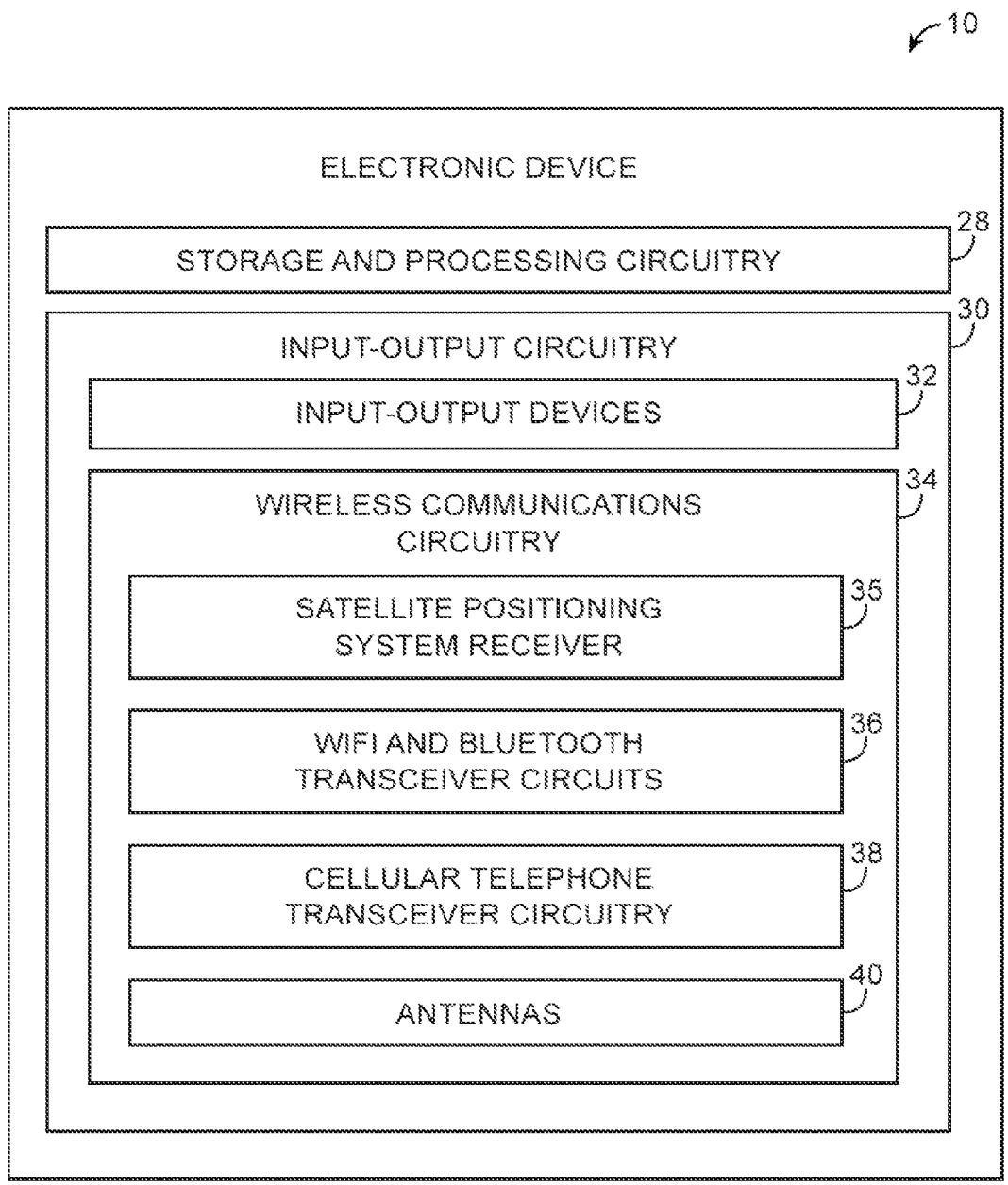
FIG. 1 is a diagram of an illustrative electronic device with wireless communications circuitry in accordance with an embodiment of the present invention.

FIG. 1 is a schematic diagram of an electronic device such as electronic device 10. Device 10 may, for example, contain circuitry for communicating with base transceiver stations, wireless access points, satellites, or other network equipment.

Device 10 may include control circuitry such as storage and processing circuitry 28. Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 and other control circuits such as control circuits in wireless communications circuitry 34 may be used to control the operation of device 10. This processing circuitry may be based on one or more microprocessors, microcontrollers, digital signal processors, baseband processors, power management units, audio codec chips, application specific integrated circuits, etc.

Storage and processing circuitry 28 may be used to run software on device 10, such as internet browsing applications, voice-over-internet-protocol (VOIP) telephone call applications, email applications, media playback applications, operating system functions, etc. To support interactions with external equipment such as a base station, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, IEEE 802.16 (WiMax) protocols, cellular telephone protocols such as the "2G" Global System for Mobile Communications (GSM) protocol, the "3G" Universal Mobile Telecommunications System (UMTS) protocol, the "4G" Long Term Evolution (LTE) protocol, etc.

Circuitry 28 may be configured to implement control algorithms that control the use of antennas in device 10. For example, circuitry 28 may configure wireless circuitry 34 to switch a particular antenna into use for transmitting and/or receiving signals. In some scenarios, circuitry 28 may be used in gathering sensor signals and signals that reflect the quality of received signals (e.g., received paging signals, received voice call traffic, received control channel signals, received traffic channel signals, etc.). Examples of signal quality measurements that may be made in device 10 include bit error rate measurements, signal-to-noise ratio measurements, measurements on the amount of power associated with incoming wireless signals, channel quality measurements based on reference signal received power (RSRP), received signal strength indicator (RSSI) information (RSSI measurements), channel quality measurements based on received signal code power (RSCP) information (RSCP measurements), channel quality measurements based on signal-to-interference ratio (SINR) and signal-to-noise ratio (SNR) information (SINR and SNR measurements), channel quality measurements based on signal quality data such as Ec/Io or Ec/No data (Ec/Io and Ec/No measurements), etc.

Input-output circuitry 30 may be used to allow data to be supplied to device 10 and to allow data to be provided from device 10 to external devices. Input-output circuitry 30 may include input-output devices 32. Input-output devices 32 may include touch screens, buttons, joysticks, click wheels, scrolling wheels, touch pads, key pads, keyboards, microphones, speakers, tone generators, vibrators, cameras, accelerometers (motion sensors), ambient light sensors, and other sensors, light-emitting diodes and other status indicators, data ports, etc. A user can control the operation of device 10 by supplying commands through input-output devices 32 and may receive status information and other output from device 10 using the output resources of input-output devices 32.

Wireless communications circuitry 34 may include radio-frequency (RF) transceiver circuitry formed from one or more integrated circuits, power amplifier circuitry, low-noise amplifier circuitry, oscillators, mixers, filters, one or more antennas, and other circuitry for handling radio-frequency signals.

Wireless communications circuitry 34 may include satellite navigation system receiver circuitry such as Global Positioning System (GPS) receiver circuitry 35 (e.g., for receiving satellite positioning signals at 1575 MHz). Transceiver circuitry 36 may handle 2.4 GHz and 5 GHz bands for WiFi® (IEEE 802.11) communications and may handle the 2.4 GHz Bluetooth® communications band. Circuitry 34 may use cellular telephone transceiver circuitry 38 for handling wireless communications in cellular telephone bands associated with the LTE radio access technology (as an example) or other cellular telephone bands of interest. Wireless communications circuitry 34 can include circuitry for other short-range and long-range wireless links if desired (e.g., WiMax circuitry, etc.). Wireless communications circuitry 34 may, for example, include wireless circuitry for receiving radio and television signals, paging circuits, etc. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communications circuitry 34 may include antennas 40. Antennas 40 may be formed using any suitable types of antenna. For example, antennas 40 may include antennas with resonating elements that are formed from loop antenna structures, patch antenna structures, inverted-F antenna structures, closed and open slot antenna structures, planar inverted-F antenna structures, helical antenna structures, strip antennas, monopoles, dipoles, hybrids of these designs, etc. Different types of antennas may be used for different bands and combinations of bands. For example, one type of antenna may be used in forming a local wireless link antenna and another type of antenna may be used in forming a remote wireless link antenna.

Figure 2:
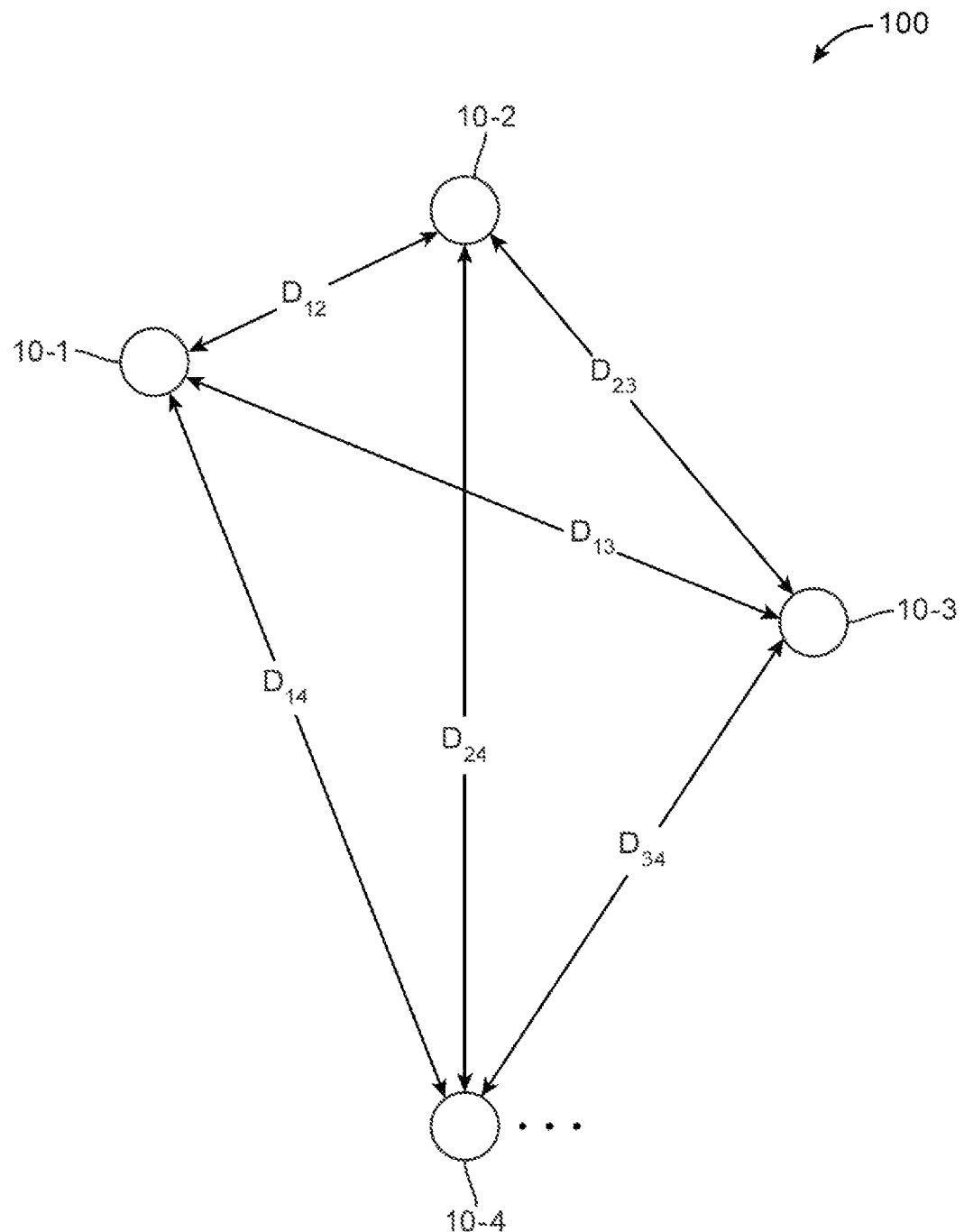
FIG. 2 is a diagram of an illustrative communications network that includes multiple nodes in accordance with an embodiment of the present invention.

FIG. 2 shows a system of multiple electronic devices 10. A system that includes devices 10 at least some of which are provided with wireless communications capabilities may be referred to as a wireless communications network. Electronic devices in a network may sometimes be referred to as "nodes." As shown in FIG. 2, network 100 includes at least four nodes such as nodes 10-1, 10-2, 10-3, and 10-4. This is merely illustrative. In general, network 100 may include fewer than four nodes or greater than four nodes.

In many applications, it may be beneficial to obtain information indicating the relative locations of multiple nodes in a network, the absolute location of each node in a network, and/or other positioning information. One way of obtaining such types of location information involves computing the relative distances between each respective pair of nodes in a network. In the example of FIG. 2, it may be desirable to determine the distance between each respective pair of nodes 10 in network 100 (e.g., to determine distance D12 between nodes 10-1 and 10-2, distance D13 between nodes 10-1 and 10-3, distance D14 between nodes 10-1 and 10-4, distance D23 between nodes 10-2 and 10-4, distance D24 between nodes 10-2 and 10-4, and distance D34 between nodes 10-3 and 10-4).

The amount of time it takes for an electromagnetic wave to propagate over-the-air from one node to another node in a wireless network is sometimes referred to as time-of-flight (TOF). Since time-of-flight is proportional to distance, time-of-flight information can be gathered (either alone or in combination with other positioning metrics such as angle-of-arrival) to estimate the relative locations of nodes in a wireless communications network.

In one suitable arrangement, one of nodes 10 in network 100 may, be selected as a "master" node. Nodes 10 in network 100 other than the master node may sometimes be referred to as "slave" nodes. The master node may first broadcast a packet to the other nodes in network 100. The other nodes may, then broadcast response packets in turn on a predetermined time-deterministic schedule relative to their reception of the packet from the master node.

For example, consider a scenario in which network 100 includes five nodes (e.g., a first node, a second node, a third node, a fourth node, and a fifth node). The first node may be selected as the master node. The first node may broadcast a packet to the other four nodes in parallel. In this example, the fifth node may receive the packet from the first node after a first delay; the second node may receive the packet from the first node after a second delay that is greater than the first delay; the third node may receive the packet from the first node after a third delay that is greater than the second delay; and the fourth node may receive the packet from the first node after a fourth delay that is greater than the third delay. As a result, the fifth node may be scheduled as the second node to broadcast, followed by the second node, third node, and fourth node in that order (i.e., the order in which the packet from the master node was received). This is merely illustrative. In another suitable arrangement, the order may be determined based on received signal strength. If desired, other ways of determining broadcast order may be implemented.

During this sequence, when any given node in network 100 is broadcasting a packet, all the other nodes are active and are listening for the packet that is currently being broadcast. Broadcasting packets simultaneously to more than one node in this way allows for the other receiving nodes to make desired timing measurements in parallel, thereby drastically reducing the total number of broadcasts needed relative to conventional relative positioning methods.

Figure 3:
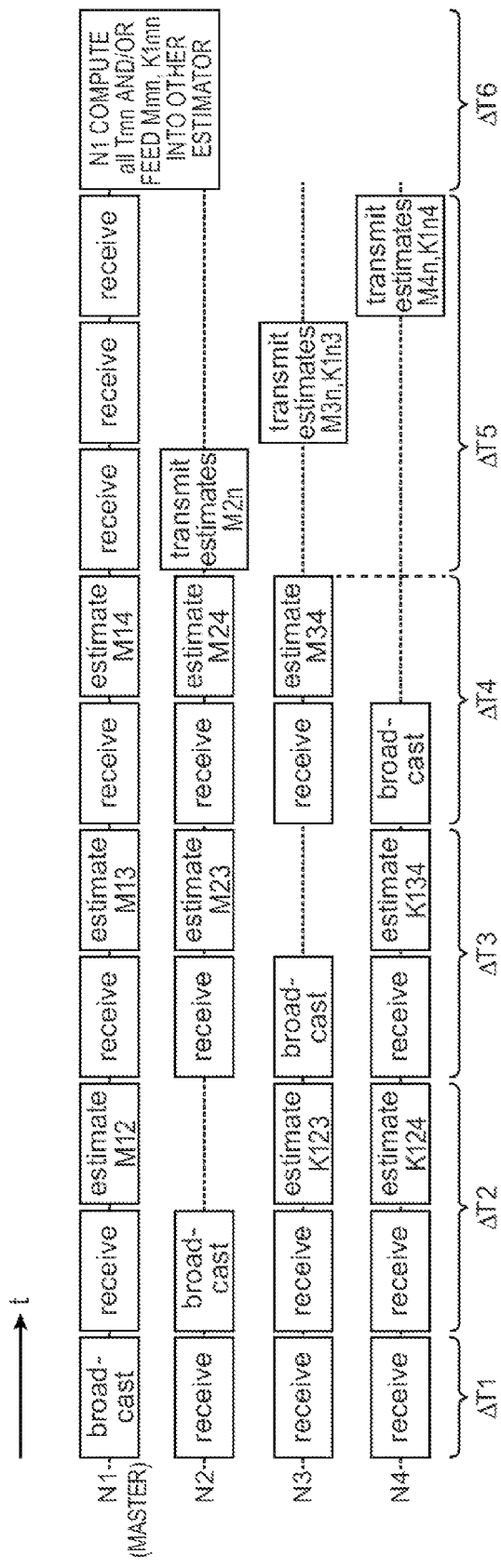
FIG. 3 is a diagram showing an illustrative broadcast schedule for use in estimating times-of-flight in accordance with an embodiment of the present invention.

FIG. 3 is a diagram showing an exemplary sequence of events that can occur in order to compute the desired times-of-flight information. In the example of FIG. 3, network 100 includes four nodes N1-N4, and node N1 may be selected as the master node. During a first time period $\Delta T1$, master node N1 may broadcast a packet while the remaining nodes N2-N4 receive the packet from node N1. In this example, assume that the packet broadcast by master node N1 is received by nodes N2, N3, and N4 in that order.

During a second time period $\Delta T2$ following $\Delta T1$, node N2 may broadcast a packet while the remaining nodes N1, N3, and N4 receive the packet from node N2 (i.e., node N2 is now the currently broadcasting node). During this time, the receiving nodes may be used to measure desired timing parameters (sometimes referred to as measured estimates or estimators) Mmn and Kimn. In this example, node N1 is configured to measure M12 while node N3 is configured to measure K123 and node N4 is configured to measure K124. Estimates M12, K123, and K124 may only be measured by nodes N1, N3, and N4 (respectively) after receiving the packet from currently broadcasting node N2. Estimates Mmn and Kimn will be defined in the following description in connection with FIG. 4.

Still referring to FIG. 3, node N3 may broadcast a packet while the remaining nodes N1, N2, and N4 receive the packet from node N3 during a third time period $\Delta T3$ following $\Delta T2$ (i.e., node N3 is now the currently broadcasting node). During this time, node N1 may be used to measure M13 while node N2 is used to measure M23 and node N4 is used to measure K134. Estimates M13, M23, and K134 may only be measured by nodes N1, N2, and N4 (respectively) after receiving the packet from currently broadcasting node N3.

During a fourth time period $\Delta T4$ following $\Delta T3$, node N4 may broadcast a packet while the remaining nodes N1, N2, and N3 receive the packet from node N4 (i.e., node N4 is now the currently broadcasting node). During this time, node N1 may be used to measure M14 while node N2 is used to measure M24 and node N3 is used to measure M34. Estimates M14, M24, and M34 may only be measured by nodes N1, N2, and N3 (respectively) after receiving the packet from currently broadcasting node N4.

During a fifth time period $\Delta T5$ following $\Delta T4$ (i.e., after every node 10 in the network has finished broadcasting and gathering desired estimates Mmn and Kimn), the slave nodes may take turn transmitting the gathered estimates back to the master node. In the example of FIG. 3, node N2 may first transmit a packet containing estimates M23 and M24 back to node N1; node N3 may then transmit a packet containing estimates M34 and K123 back to node N1; and node N4 may then transmit a packet containing estimates K124 and K134 back to node N1.

Generally, in a network with N different nodes, there may be N broadcasts (e.g., a single broadcast from each node 10 in the network) followed by (N−1) transmits from each of the slave nodes back to the master node. Transmitting the estimated timing parameters back to the master node serves to centralize the estimated timing parameters at the master node. For example, consider a network that includes 20 nodes. In this scenario, only 20 broadcasts and 19 transmits may be required to compute 190 times-of-flight (20!/(18!*2)) among the 20 different nodes.

Once all the estimates have been centralized at the master node, the master node may be used to compute the times-of-flight (Tmn) for each respective pair of nodes in the network based on the gathered estimates during time period ΔT6 following ΔT5. If desired, estimates Mmn and Kimn may be fed into computing equipment that is capable of estimating Tmn based on other positioning parameters including but not limited to angle of arrival (AOA), time difference of arrival (TDOA), absolute or differential Global Navigation Satellite System Services (e.g., GLONASS, GPS, DGPS, etc.), just to name a few. Times-of-flight Tmn need not be the primary parameter of interest. Other suitable types of information may be gathered to help determine the locations of the multiple nodes relative to one another in the network.

Figure 4:
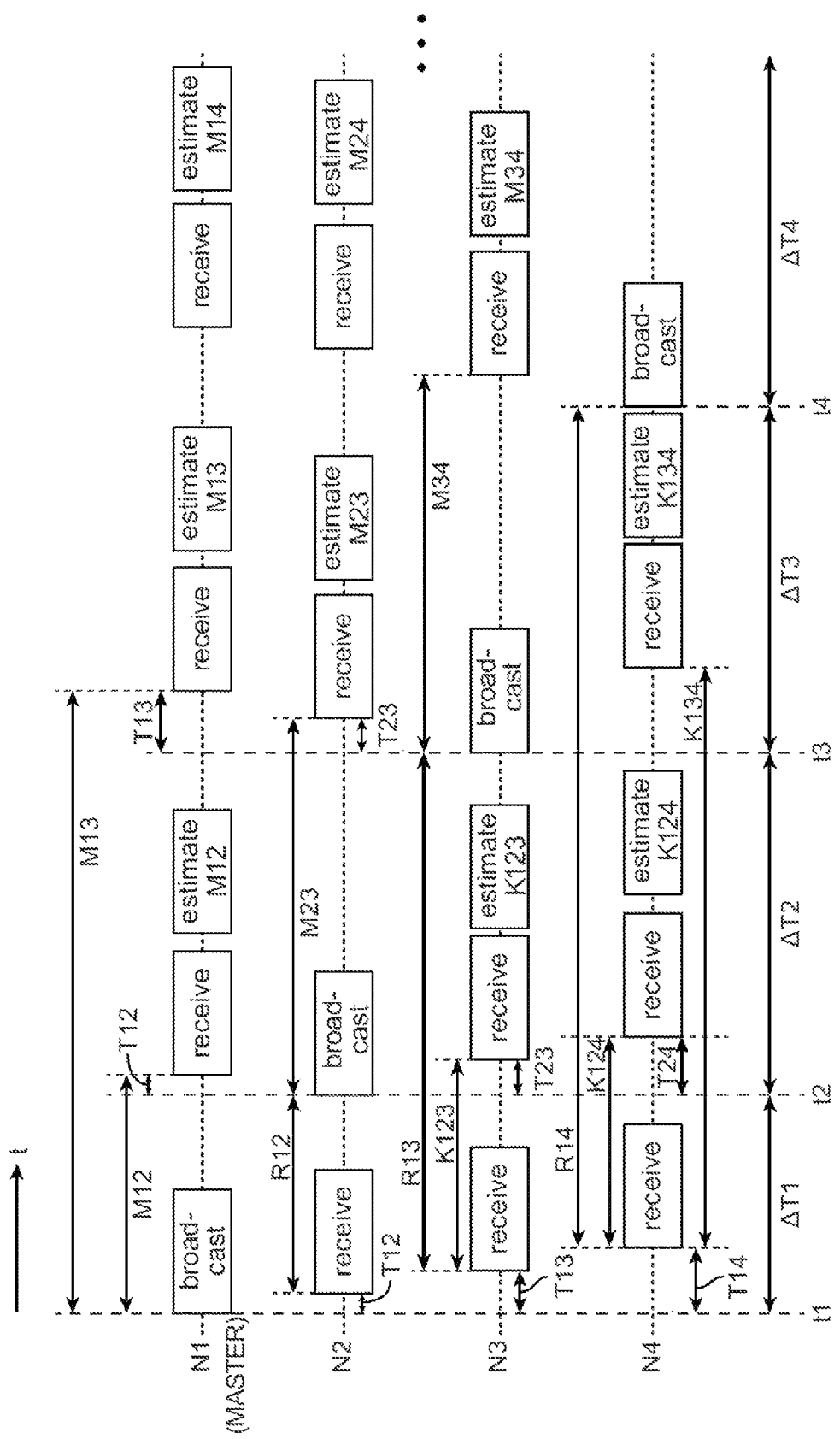
FIG. 4 is a timing diagram illustrating different timing parameters that can be measured for estimating times-of-flight in accordance with an embodiment of the present invention.

FIG. 4 is a timing diagram that shows the different timing parameters that can be estimated during an illustrative broadcast sequence. As shown in FIG. 4, there may be at least four different types of timing parameters that can be estimated including Tmn, Rmn, Mmn, and Kimn. Parameter Tmn may be defined as the time-of-flight between nodes m and n (in either direction). Parameter Tmn may be proportional to the physical distance Dmn (see, e.g., FIG. 2, where Dmn is equal to the product of Tmn and the speed of light). In the example of FIG. 4, T12 may be equal to the amount of time it takes for an electromagnetic wave to travel between nodes 1 and 2; T13 may be equal to the amount of time it takes for an electromagnetic wave to travel between nodes 1 and 3; T23 may be equal to the amount of time it takes for an electromagnetic wave to travel between nodes 2 and 3; T24 may be equal to the amount of time it takes for an electromagnetic wave to travel between nodes 2 and 4, etc.

Time-of-flight Tmn may be computed from known parameters such as Rmn and from estimated parameters such as Mmn and Kimn. Parameter Rmn may be defined as the "reflection" time from the start of node m's broadcast packet arriving at node n until the start of node n's broadcast packet transmission. Parameter Rmn should be a fixed, known/characterized quantity. Uncertainty or variance in the actual Rmn versus the value assumed in the computations will increase the uncertainty or variance in the estimated times of flight. In the example of FIG. 4, R12 may be equal to the amount of time between the start of node 1's broadcast packet arriving at node 2 and the start of node 2's broadcast at time t2; R13 may be equal to the amount of time between the start of node 1's broadcast packet arriving at node 3 and the start of node 3's broadcast at time t3; R14 may be equal to the amount of time between the start of node 1's broadcast packet arriving at node 4 and the start of node 4's broadcast at time t4, etc. Because Rmn is a predetermined quantity, Rmn need not be estimated by the different nodes, as long as the master node contains the necessary Rmn information prior to the final Tmn computation.

Parameters Mmn may be defined as the estimated time at node m between node m's broadcast packet and node m receiving node n's broadcast packet. In the example of FIG. 4, M12 may be equal to the amount of time between node 1's broadcast and node 1 receiving node 2's broadcast (as estimated by node 1); M13 may be equal to the amount of time between node 1's broadcast and node 1 receiving node 3's broadcast (as estimated by node 1); M23 may be equal to the amount of time between node 2's broadcast and node 2 receiving node 3's broadcast (as estimated by node 2); M34 may be equal to the amount of time between node 3's broadcast and node 3 receiving node 4's broadcast (as estimated by node 3), etc.

Parameters Kimn may be defined as the estimated time at node n between receiving node i's broadcast packet and receiving node m's broadcast packet. In the example of FIG. 4, K123 may be equal to the amount of time between node 3 receiving node 1's broadcast and node 3 receiving node 2's broadcast (as estimated by node 3); K134 may be equal to the amount of time between node 4 receiving node 1's broadcast and node 4 receiving node 3's broadcast (as estimated by node 4), etc.

Parameters Mmn obtained in this way are sometimes referred to as "upper diagonal" estimators or "primary" estimates, whereas parameters Kimn obtained in this way are sometimes referred to as "lower diagonal" estimators or "secondary" estimates. The primary and secondary estimates may be transmitted to the master node for Tmn computation once all the nodes have finished broadcasting packets (e.g., during time ΔT5 in FIG. 3). Times-of-flight Tmn may be computed based on at least one of the primary and secondary estimators.

Figure 5:
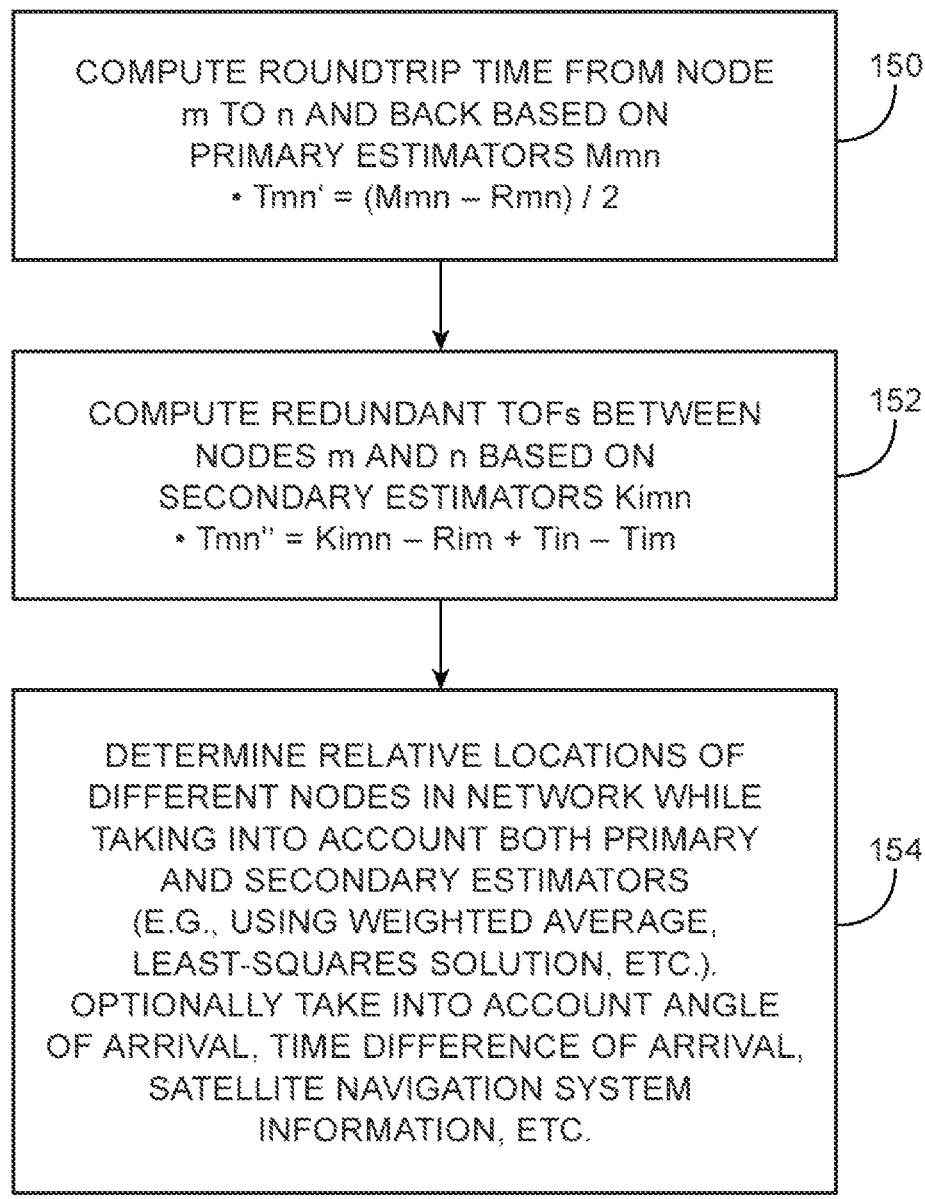
FIG. 5 is a flow chart of illustrative steps for computing times-of-flight (TOFs) using primary TOF estimators and secondary TOF estimators in accordance with an embodiment of the present invention.

FIG. 5 is a flow chart of illustrative steps for computing times-of-flight. At step 150, simple roundtrip times from node m to node n and back may be computed based on primary estimators Mmn. The simple roundtrip time may be expressed generally as follows:

$$Mmn = 2*Tmn' + Rmn \quad (1)$$

As shown in the example of FIG. 4, M12 may be equal to the sum of 2*T12 and R12. As another example, M13 may be equal to the sum of 2*T13 and R13. Solving equation 1 for Tmn', the expression then becomes:

$$Tmn' = (Mmn - Rmn)/2 \quad (2)$$

Calculating of Tmn' using equation 2 is based only on primary estimators Mmn and known Rmn parameters.

At step 152, redundant times-of-flight Tmn" between nodes m and n may be computed based on secondary estimators Kimn. In general, the relationship between Tnm", Kimn, and Rmn can be expressed as follows:

$$Tin + Kimn - Tmn'' = Tim + Rim \quad (3)$$

As an example, T13 plus K123 minus T23 may be equal to the sum of T12 and R12 (see, e.g., FIG. 4). Solving equation 3 for Tmn", the expression then becomes:

$$Tmn'' = Kimn - Rim + Tin - Tim \quad (4)$$

Calculating redundant Tmn" using equation 4 is based only on secondary estimators Kimn, other computed TOFs (e.g., Tin and Tim), and known Rmn parameters.

At step 154, the master node may be used to compute a final Tmn while taking into account at least one of the primary and secondary estimators. In one suitable embodiment, the final Tmn may be calculated using only equation 2. In another suitable embodiment, the final Tmn may be calculated using only equation 4. In yet another suitable embodiment, the final Tmn (i.e., Tmn_final) may take into account both primary and secondary estimators (e.g., both equations 2 and 4 may be used). The primary and second estimators may be combined using a weighted average scheme (e.g., Tmn_final=a*Tmn'+(1−a)*Tmn", whereas 0≤a≤1), a least-squares solution (e.g., to solve for solutions in a system of over-determined equations), and/or other computational schemes. If desired, node 1 may feed estimates Mmn and Kimn may into a larger estimator to optionally take into account angle of arrival, time difference of arrival, satellite navigation system information, and/or other positioning information.

In wireless communications networks, measurements obtained by the different nodes are not necessarily made on the same time base. As a result, systematic frequency-based errors can occur between nodes. Frequency-based errors can cause errors in the estimation of primary and second estimators, which can lead to inaccuracies when determining the relative positions of nodes in network 100. This problem is exacerbated for networks with large numbers of nodes since the elapsed time between events grows proportionally with the total number of nodes in the network (e.g., frequency-induced error accumulates to a timing error that is proportional the elapsed time). For example, consider a network with 15 nodes. In this example, K1-19-20 may be equal to the amount of time between node 20 receiving node 1's broadcast and node 20 receiving node 19's broadcast (as estimated by node 20) and can be fairly long in duration assuming node 19 will have to wait for the other 18 nodes to finish broadcasting.

Figure 6:
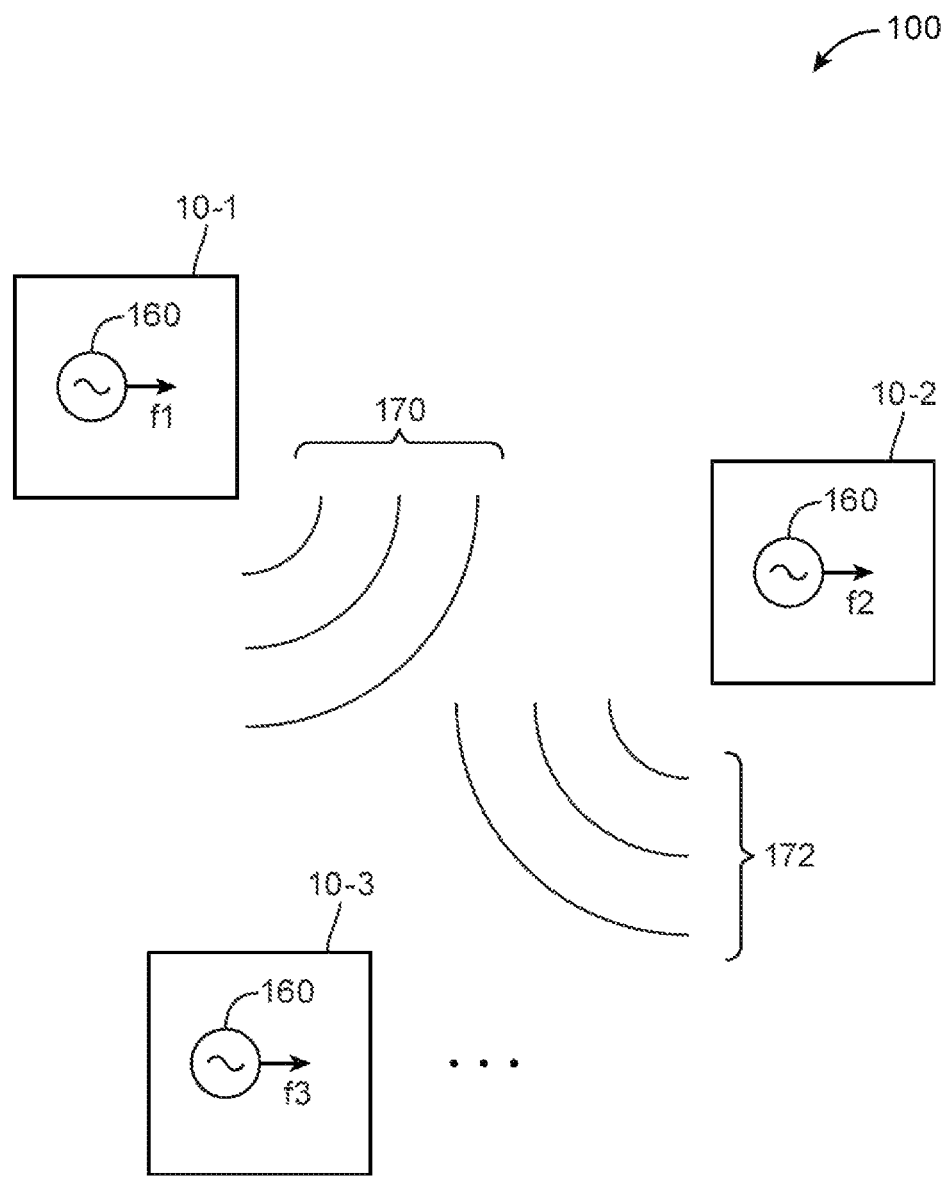
FIG. 6 is a diagram showing how different nodes in a wireless network can exhibit frequency errors in accordance with an embodiment of the present invention.

FIG. 6 is a diagram that shows a network 100 with at least three nodes 10-1, 10-2, and 10-3. Node 10-1 may include a crystal oscillator 160 that is used to generate a first clock signal having a frequency f1. Node 10-2 may include crystal oscillator 160 that is used to generate a second clock signal having a frequency f2. Node 10-3 may include crystal oscillator 160 that is used to generate a third clock signal having a frequency f3. Ideally, the first, second, and third clock signals are exactly identical to one another. In practice, however, frequencies f1, f2, and f3 may not be exactly equal and there may be clock skew between the different clock signals. Frequency mismatch and clock skew can both contribute to frequency-based errors when measuring desired timing parameters such as primary estimators Mmn and secondary estimators Kimn.

Consider the scenario in FIG. 6 in which node 10-3 is used to measure K123. At a first point in time, node 10-1 may broadcast a packet 170. Packet 170 may be received by node 10-3 at a second point in time. At a third point in time, node 10-2 may broadcast a packet 172. Packet 172 may be received by node 10-3 at a fourth point in time. Parameter K123 may be estimated by observing the amount of time that has elapsed between the second point in time and the fourth point in time. Node 10-3 will eventually transmit K123 back to node 10-1 (assuming node 10-1 is selected as the master node) at a later point in time. In this example, any frequency mismatch and clock skew between the three different clocks can result in frequency-induced errors in K123.

To reduce such types of timing errors, frequency synchronization (or "synch" for short) operations may be performed for the different nodes in the network. For example, during a frequency synch procedure, the master node can broadcast a frequency-synch packet while the other slave nodes receive the frequency-synch packet. Upon receiving the frequency-synch packet, each of the slave nodes can adjust their frequency references accordingly. Any signal processing method that is well known in the art can be used to estimate and correct its own frequency error relative to the signal received from the master. Ideally, at least some of the bits in the received signal are known in advance to help improve frequency estimation, although in cases where nodes can receive the broadcasts of other nodes with high signal quality, then even the extreme case of no bits known in advance can be supported.

In one suitable arrangement, each of the slave nodes can report its own error back to the master node. In another suitable arrangement, each slave node estimates its own error and self-corrects its clock to match the clock in the master node. These frequency error correction methods are merely illustrative and do not serve to limit the scope of the present invention. If desired, other ways of performing frequency error reduction/compensation may be used.

Figures 7A, 7B:
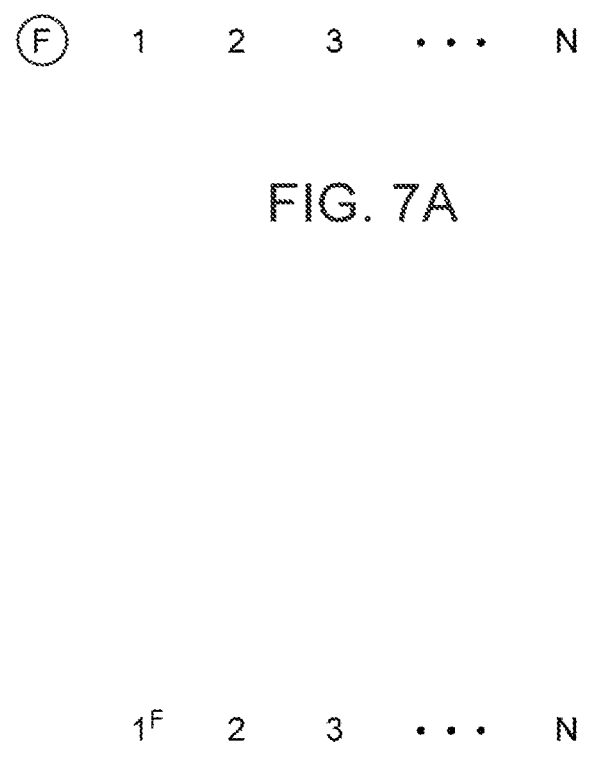

The frequency-synch signal can be sent as a separate packet before the scheduled sequence of broadcasts for TOF estimation (see, e.g., FIG. 7A). As shown in FIG. 7A, a frequency-synch packet F can be broadcast before nodes 1, 2, 3, . . . , N take turns broadcasting in that order. In another suitable embodiment, the frequency-synch signal might be sent along with the first packet of the broadcast sequence (see, e.g., FIG. 7B). As shown in FIG. 7B, frequency-synch signal F may be transmitted along with other timing information during node 1's scheduled broadcast (as indicated by $1^F$). In other words, signals for frequency synchronization and signals for timing estimation may be broadcast one after the other while embedded in a single broadcast packet from the master node, or the broadcast packet may be constructed such that the whole packet serves both purposes of frequency synch and timing estimation.

Since frequency errors can accumulate over time, periodic updates of frequency synchronization may be required to achieve desired positioning accuracy. In some scenarios, multiple broadcast iterations may be required per node to improve TOF estimation accuracy. In such scenarios, frequency synchronization may be performed whenever node 1 (i.e., the master node) rebroadcasts (see, e.g., FIG. 8A). As shown in FIG. 8A, frequency-synch signals F may be transmitted at the beginning of each broadcast iteration whenever node 1 broadcasts.

To reduce potentially long time intervals between frequency-synch operations in scenarios where the number of nodes N in a network is large (e.g., when N is greater than five, when N is greater than 10, when N is greater than 20, etc.), a frequency-synch broadcast may be interspersed between consecutive slave node broadcasts (see, e.g., FIG. 8B). As shown in FIG. 8B, frequency-synch signals F may be transmitted between node 2's broadcast and node 3's broadcast, between node 3's broadcast and node 4's broadcast, . . . , between node (N−1)'s broadcast, and node N's broadcast, etc.

In general, any suitable number of frequency-synch operations may be performed during each broadcast iteration. FIG. 8C shows an example in which frequency-synch signals are transmitted twice during each broadcast iteration. As shown in FIG. 8C, frequency-synch signals F may be transmitted at the start of each broadcast iteration whenever master node 1 broadcasts and may also be transmitted one more time between node (K−1)'s broadcast and node K's broadcast (where 1<K<N).

As described previously in connection with FIG. 3, TOF estimation may require at least N broadcasts followed by (N−1) transmits of the estimated parameters (e.g., primary estimated parameters Mmn and secondary estimated parameters Kimn) back to the master node. FIG. 9 shows multiple broadcast iterations, where N broadcasts and (N−1) transmits may be performed during each broadcast iteration. At time t1, each node in the network may take turns broadcasting timing information to the other listening nodes. After all the nodes are done broadcasting in this current iteration, node 2 may transmit its estimates back to node 1 (at time t2), node 3 may transmit its estimates back to node 1 (at time t3), . . . , and node N may transmit its estimates back to node 1 (at time t4). At time t5, a subsequent broadcast iteration may be performed.

For scenarios in which multiple broadcast iterations are performed, the transmissions useful only for centralizing the estimates at the master node may be incorporated directly into the broadcasts of the next iteration to reduce TOF estimation time (e.g., the time period from t2 to t5 in FIG. 9 may be eliminated). This approach is illustrated in FIG. 10.

FIG. 10 shows multiple broadcast iterations, where only N broadcasts are performed during each broadcast iteration (e.g., the N broadcasts are not followed by (N−1) transmits of estimates back to the master node). During a first broadcast iteration from time t1 to t2, each of the N nodes in the network may take turn broadcasting timing information to the other listening nodes. After all the nodes are done broadcasting in this current iteration, a subsequent broadcast iteration may be initiated (at time t2).

During a second broadcast iteration from time t2 to t6, each of the N nodes may again take turn broadcasting timing information to the other listening nodes. During each slave node broadcast, the estimated timing parameters obtained during the previous broadcast iteration may be conveyed back to the master node along with the current broadcast. In the example of FIG. 10, node 2 may be configured to broadcast a packet that includes primary/secondary estimates obtained during the first broadcast iteration (at time t3); node 3 may be configured to broadcast a packet that includes primary/secondary estimates obtained during the first broadcast iteration (at time t4), . . . , and node N may be configured to broadcast a packet that includes primary/secondary estimates obtained during the first broadcast iteration (at time t5). At time t6, a subsequent broadcast iteration may be initiated.

Figure 11:
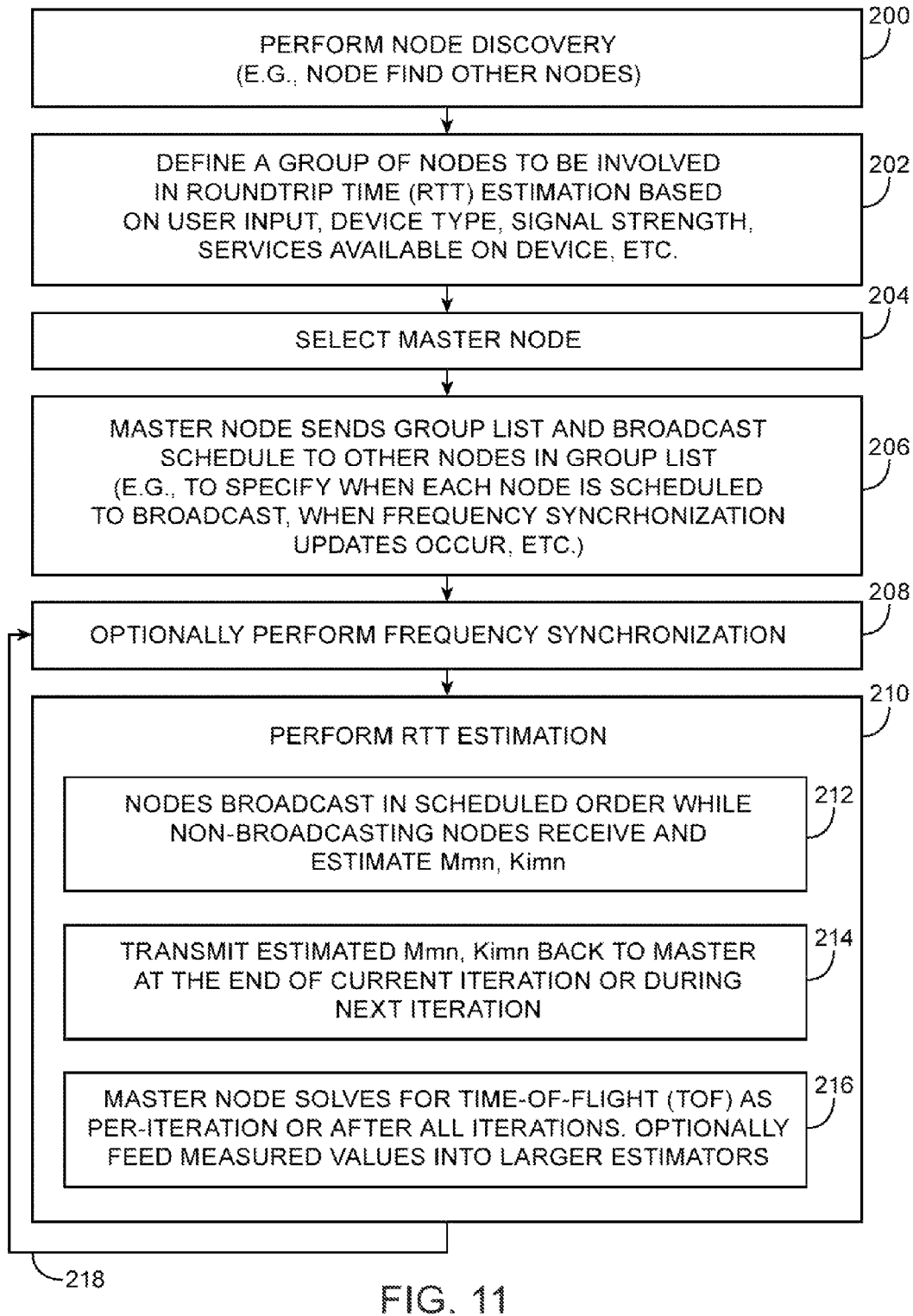
FIG. 11 is a flow chart of illustrative steps involved in determining relative positions of different nodes in a wireless network in accordance with an embodiment of the present invention.

FIG. 11 is a flow chart of illustrative steps involved in operating different nodes in a wireless communications network for use in determining the relative positions of the different nodes in the wireless communications network. At step 200, node discovery operations may be performed (e.g., each node in network 100 may detect other present nodes). At step 202, at least a portion of the detected nodes may be selected to be part of a group to be involved in roundtrip time (RTT) estimation based on user input, device type, signal strength, types of services available on each device, and other suitable parameters (e.g., nodes of interest may be defined as part of a group list).

At step 204, a master node may be selected from the group list (e.g., one of the nodes may be selected as the master node). At step 206, the master node may send the group list information and broadcast schedule to the other nodes (e.g., slave nodes) to specify when each of the slave nodes is allowed to broadcast, when frequency synchronization updates occur, and other timing requirements.

At step 208, frequency synchronization may be performed in a way as described in connection with FIG. 7A or 7B (as examples).

At step 210, RTT estimation operations may be performed. In particular, each of the different nodes in the defined group list may take turns broadcasting according to the specified schedule while other non-broadcasting nodes receive and obtain estimates Mmn and Kimn (step 212). Estimates obtained in this way may be transmitted back to the master node at the end of the current broadcast iteration or during a subsequent broadcast iteration (step 214, as described in connection with FIGS. 9 and 10). The master node may then solve for the times-of-flight at the end of the current broadcast iteration or after multiple broadcast iterations have been complete. If desired, the primary estimates Mmn and secondary estimates Kimn, characterized reflection timing information Rmn, and other timing parameters may be fed into a larger estimator to take into account other positioning metrics such as angle of arrival, time difference of arrival, absolute or differential satellite navigation system information, etc. Processing may then loop back to step 208 to re-compute TOF information (as indicated by path 218).

The foregoing is merely illustrative of the principles of this invention and various modifications can be made by those skilled in the art without departing from the scope and spirit of the invention. The foregoing embodiments may be implemented individually or in any combination.

What is claimed is:

1. A method of operating a plurality of nodes in a wireless communications network, comprising:
broadcasting a respective packet according to a schedule with each of the plurality of nodes with at most one node broadcasting at any given point in time;
while a first node in the plurality of nodes is broadcasting a first packet, receiving the first packet with a second node in the plurality of nodes and a third node in the plurality of nodes;
while the second node is broadcasting a second packet, receiving the second packet with the first node and the third node;
while the third node is broadcasting a third packet, receiving the third packet with the first node and the second node;
in response to receiving the first, second, and third packets, calculating timing estimates at the first, second, and third nodes;
with the first node, computing a first time-of-flight between the first node and the second node as a function of the timing estimates, wherein the first time-of-flight is equal to an amount of time between when the first node broadcast the first packet and when the first node received the second packet broadcast by the second node;
with the second node, computing a second time-of-flight between the second node and the third node as a function of the timing estimates, wherein the second time-of-flight is equal to an amount of time between when the second node broadcast the second packet and when the second node received the third packet broadcast by the third node;
with the first node, computing a third time-of-flight between the first node and the third node as a function of the timing estimates, wherein the third time-of-flight is equal to an amount of time between when the first node broadcast the first packet and when the first node received the third packet broadcast by the third node;
with the first node, computing a redundant time-of-flight between the first node and the second node by computing the difference between the second time-of-flight and the third time-of-flight; and
determining relative positions of the plurality of nodes in the wireless communications network as a function of the times-of-flight and the redundant times-of-flight.

2. The method defined in claim 1, wherein calculating the timing estimates comprises calculating timing estimates of a first type with the first node and calculating timing estimates of a second type that is different than the first type with the third node.

3. The method defined in claim 2, wherein calculating timing estimates of the second type comprises:
with the third node in the plurality of nodes, estimating an amount of time between the third node receiving the first packet from the first node and receiving the second packet from the second node.

4. The method defined in claim 1, further comprising:
selecting one of the plurality of nodes as a master node; and
with nodes in the plurality of nodes other than the master node, transmitting the timing estimates to the master node.

5. The method defined in claim 4, further comprising:
periodically performing frequency synchronization operations by broadcasting frequency synchronization signals with the master node.

6. A method of operating a plurality of nodes in a wireless communications network, comprising:
with a first node in the plurality of nodes, broadcasting a first broadcast packet at a first point in time;
with a second node in the plurality of nodes, receiving the first broadcast packet at a second point in time and broadcasting a second broadcast packet at a third point in time;
with a third node in the plurality of nodes, receiving the first broadcast packet from the first node at a fourth point in time, receiving the second broadcast packet from the second node at a fifth point in time, and broadcasting a third broadcast packet at a sixth point in time;
with the first node in the plurality of nodes, receiving the second broadcast packet at a seventh point in time, and calculating a primary timing estimate equal to an amount of time between the first point in time and the seventh point of time;
with the first node in the plurality of nodes, calculating a first time-of-flight between the first node and the second node equal to half of the difference between the primary timing estimate and a predetermined value, the predetermined value equal to an amount of time between the second point in time and the third point in time;
with the first node in the plurality of nodes, calculating a second time-of-flight between the second node and the third node, the second time-of-flight equal to an amount of time between the third point in time and the fifth point in time;
with the first node in the plurality of nodes, calculating a secondary timing estimate equal to an amount of time between the fourth point in time and the fifth point in time;
with the first node in the plurality of nodes, calculating:
a first value equal to the difference between the secondary timing estimate and an additional predetermined value, the additional predetermined value equal to an amount of time between the fourth point in time and the sixth point in time;
a second value equal to the difference between the second time-of-flight and a third time-of-flight between the first node and the third node; and
a fourth time-of-flight between the first node and the second node by adding the first and second values; and
determining relative positions of the plurality of nodes in the wireless communications network using at least one of the first time-of-flight, the second time-of-flight, the third time-of-flight, and the fourth time-of-flight.

7. The method defined in claim 6, further comprising:
combining the first time-of-flight and the fourth time-of-flight using a least-squares method.

8. The method defined in claim 6, further comprising:
combining the first time-of-flight and the fourth time-of-flight using a weighted average method.

9. The method defined in claim 6, further comprising:
with computing equipment, computing at least one of the first, second, third, and fourth times-of-flight based on timing parameters selected from the group consisting of: angle of arrival information, time difference of arrival information, and satellite navigation system information.

10. The method defined in claim 6, further comprising:
performing periodic frequency synchronization updates by broadcasting frequency synchronization signals with a selected node in the plurality of nodes.

11. A method of operating a plurality of nodes in a wireless communications network, comprising:
broadcasting respective packets with the plurality of nodes according to a schedule;
while one of the plurality of nodes is broadcasting a packet, receiving the broadcast packet with the other remaining nodes in the plurality of nodes in parallel;
in response to receiving the broadcast packet, obtaining timing estimates at each of the receiving nodes, obtaining the timing estimates at each of the receiving nodes comprising:
with a first node in the plurality of nodes, calculating a primary timing estimate equal to a first amount of time between the first node broadcasting a first broadcast packet and the first node receiving a second broadcast packet from a second node in the plurality of nodes; and
with the first node, calculating a secondary timing estimate equal to a second amount of time between a third node in the plurality of nodes receiving the first broadcast packet broadcast from the first node and receiving the second broadcast packet from the second node;
with the first node, calculating a first time-of-flight equal to half of the difference between the primary timing estimate and a predetermined amount of time, wherein the predetermined amount of time is equal to a third amount of time between when the second node receives the first broadcast packet and when the second node broadcasts the second broadcast packet;
with the first node, calculating a second time-of-flight between the first node and the second node as a function of the secondary timing estimate and a third time-of-flight between the first node and the third node; and
determining relative positions of the plurality of nodes in the wireless communications network using at least one of the first time-of-flight, the second time-of-flight, and the third time-of-flight.

12. The method defined in claim 11, further comprising:
selecting one of the plurality of nodes as a master node; and with nodes in the plurality of nodes other than the master node, transmitting the timing estimates to the master node.

13. The method defined in claim 12, wherein transmitting the timing estimates to the master node comprises separately transmitting the timing estimates to the master node after each of the plurality of nodes have finished broadcasting.

14. The method defined in claim 12, wherein broadcasting the respective packets with the plurality of nodes according to the schedule comprises performing multiple broadcast iterations in which each node in the plurality of nodes is scheduled to broadcast once during each of the multiple broadcast iterations.

15. The method defined in claim 14, wherein performing multiple broadcast iterations comprises:
   performing a first broadcast iteration; and
   performing a second broadcast iteration during which timing estimates obtained during the first broadcast iteration are conveyed to the master node.

16. The method defined in claim 1, wherein calculating the timing estimates comprises:
   calculating a value of a first amount of time between when the first node broadcasts the first packet and when the first node receives the second packet, the method further comprising:
   obtaining a predetermined value of a second amount of time between when the second node in the plurality of nodes receives the first packet and when the second node in the plurality of nodes broadcasts the second packet; and
   computing the first time-of-flight by calculating a difference between the value and the predetermined value.

17. The method defined in claim 11, wherein calculating the second time-of-flight as the function of the secondary timing estimate and the third time-of-flight between the first node and the third node comprises:
   calculating a first difference between the secondary timing estimate and an additional predetermined amount of time, wherein the additional predetermined amount of time is equal to a fourth amount of time between when the third node receives the first broadcast packet and when the third node broadcasts a third broadcast packet;
   calculating a sum of the first difference and a fourth time-of-flight between the second node and the third node; and
   calculating a second difference between the sum and the third time-of-flight, wherein the second time-of-flight is equal to the second difference.

* * * * *